(12) United States Patent
Anthony (10) Patent No.: US 11,387,008 B2
(45) Date of Patent: Jul. 12, 2022

(54) PASSIVE CONTAINMENT COOLING SYSTEM FOR BOILING WATER REACTOR AND METHOD OF INSTALLATION

(71) Applicant: GE-Hitachi Nuclear Energy Americas LLC, Wilmington, NC (US)

(72) Inventor: Gary M. Anthony, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 16/731,130

(22) Filed: Dec. 31, 2019

(65) Prior Publication Data

US 2021/0202119 A1 Jul. 1, 2021

(51) Int. Cl.
*G21C 15/16* (2006.01)
*G21C 1/08* (2006.01)
(Continued)

(52) U.S. Cl.
CPC .............. *G21C 15/16* (2013.01); *G21C 1/084* (2013.01); *G21C 19/303* (2013.01); *G21C 21/00* (2013.01)

(58) Field of Classification Search
CPC ........ G21C 15/02; G21C 15/12; G21C 15/16; G21C 15/25; G21C 1/08; G21C 1/084;
(Continued)

(56) References Cited

U.S. PATENT DOCUMENTS

| 3,071,527 | A | * | 1/1963 | Young | G21C 15/20 |
| | | | | | 376/368 |
| 5,327,471 | A | * | 7/1994 | Meier | G21C 3/32 |
| | | | | | 376/439 |

(Continued)

FOREIGN PATENT DOCUMENTS

| EP | 0462810 A1 | 12/1991 |
| EP | 1078376 B1 * | 11/2007 | ............. G21C 15/26 |

(Continued)

OTHER PUBLICATIONS

International Search Report and Written Opinion thereof dated Jun. 28, 2021 for corresponding International Application No. PCT/US2020/067139.

*Primary Examiner* — Jack W Keith
*Assistant Examiner* — Jinney Kil
(74) *Attorney, Agent, or Firm* — Harness, Dickey & Pierce, P.L.C.

(57) ABSTRACT

A boiling water reactor includes a reactor building, a reactor cavity pool, a primary containment vessel, and a passive containment cooling system. The reactor building includes a top wall defining a penetration therein, a bottom wall, and at least one side wall, which define a chamber. At least a portion of the primary containment vessel is in the chamber. The passive containment cooling system includes a thermal exchange pipe including an outer pipe and an inner pipe. The outer pipe has a first outer pipe end and a second outer pipe end. The first outer pipe end is closed and in the primary containment vessel. The second outer pipe end is open and (Continued)

extends into the reactor cavity pool. The inner pipe has a first inner pipe end and a second inner pipe end, which are open. The second inner pipe end extends into the reactor cavity pool.

15 Claims, 4 Drawing Sheets

(51) Int. Cl.
  *G21C 19/303* (2006.01)
  *G21C 21/00* (2006.01)
(58) Field of Classification Search
  CPC .......... G21C 1/088; G21C 1/09; G21C 19/28; G21C 19/303; G21C 19/307; G21C 13/067
  USPC .................................................. 376/292, 298
  See application file for complete search history.

(56) References Cited

U.S. PATENT DOCUMENTS

| | | | |
|---|---|---|---|
| 5,377,243 A | 12/1994 | Hill | |
| 6,243,432 B1 | 6/2001 | Cheung et al. | |
| 9,773,572 B2 * | 9/2017 | Bodner | G21C 19/19 |
| 2009/0252276 A1 * | 10/2009 | Ishida | F04F 5/54 |
| | | | 376/361 |
| 2013/0089174 A1 * | 4/2013 | Diamond | G21C 1/20 |
| | | | 376/366 |
| 2015/0155060 A1 * | 6/2015 | Yetisir | G21C 15/06 |
| | | | 376/361 |

FOREIGN PATENT DOCUMENTS

| | | | | |
|---|---|---|---|---|
| EP | 3506318 A2 | 7/2019 | | |
| JP | H0310198 B2 * | 2/1991 | | G11C 19/00 |

* cited by examiner

PASSIVE CONTAINMENT COOLING SYSTEM FOR BOILING WATER REACTOR AND METHOD OF INSTALLATION

BACKGROUND

Field

The present disclosure relates to a passive containment cooling system for a boiling water reactor.

Description of Related Art

After a nuclear reactor shuts down, byproducts of the nuclear reaction continue to undergo radioactive decay and generate heat. Decay heat from the byproducts of the nuclear reaction is removed in order to limit and/or prevent damage to the nuclear fuel. If the nuclear reactor has a containment system, the decay heat may be removed from the containment system to limit and/or avoid over-pressurization and damage to the containment system. Nuclear plants with passive-safety features may remove this decay heat by natural convection, conduction and/or radiant heat transfer unassisted by forced flow or electric power.

Some reactor designs include a Passive Containment Cooling System (PCCS) to remove the reactor's decay heat from the containment system. The PCCS system may include PCCS condensers, which can condense the steam generated if the reactor core cooling fails or there is a leak. PCCS condensers may include channels (e.g., tubes and/or parallel plates) and may transfer heat to a pool outside of containment and release it to the atmosphere as water vapor, or directly transfer it to the air.

In an accident scenario, the nuclear reactor may be depressurized to the containment system. For a nuclear plant with a PCCS, depressurizing the nuclear reactor to the containment system may force steam, nitrogen and other non-condensable gases into the Primary Containment Vessel. After reactor depressurization, the steam condenses on the exterior of the PCCS condenser and may be mostly steam and may include trace amounts of non-condensable gases (e.g., hydrogen, oxygen and nitrogen).

SUMMARY

Some example embodiments relate to a boiling water reactor comprising a reactor building, a reactor cavity pool, a primary containment vessel, and a passive containment cooling system (PCCS). The reactor building includes a top wall defining a penetration therein, a bottom wall, and at least one side wall. The top wall, the bottom wall, and the at least one side wall define a chamber. The reactor cavity pool is adjacent the reactor building. At least a portion of the primary containment vessel is in the chamber of the reactor building. The passive containment cooling system is configured to receive water and expel hot water. The passive containment cooling system includes a thermal exchange pipe. The thermal exchange pipe includes an outer pipe having a first outer pipe end and a second outer pipe end. The first outer pipe end is closed and the second outer pipe end is open. The first outer pipe end is within the primary containment vessel. The second outer pipe end extends through the penetration in the top wall of the reactor building and into the reactor cavity pool such that the outer pipe is in fluid communication with the primary containment vessel and the reactor cavity pool. The thermal exchange pipe also includes an inner pipe at least partially within the outer pipe. The inner pipe has a first inner pipe end and a second inner pipe end. The first inner pipe end and the second inner pipe end are open. The second inner pipe end extends out of the outer pipe and into the reactor cavity pool such that the second inner pipe end is in fluid communication with the reactor cavity pool.

In at least one example embodiment, the outer pipe comprises a pipe wall defining an opening. The inner pipe comprises a portion between the first inner pipe end and the second inner pipe end. The portion extends through the opening in the side of the pipe wall.

In at least one example embodiment, the outer pipe has a diameter of 200 mm to 520 mm. The inner pipe has a diameter of 50 mm to 200 mm. The inner pipe and the outer pipe comprise stainless steel or appropriate materials for pressure retaining and corrosion.

In at least one example embodiment, the boiling water reactor further comprises at least one seal around the outer pipe and adjacent the penetration in the top wall of the reactor building.

In at least one example embodiment, the passive containment cooling system includes a plurality of thermal exchange pipes. The passive containment cooling system includes two to twenty thermal exchange pipes.

In at least one example embodiment, the boiling water reactor further includes at least one support within the primary containment vessel. The at least one support is configured to support the first end of the outer pipe of the thermal exchange pipe. The at least one support comprises a spring support, which is configured to allow vertical movement of the thermal exchange pipe caused by expansion due to absorption of heat.

In at least one example embodiment, the passive containment cooling system is valve-free, pump-free, or both valve-free, and pump-free.

At least one example embodiment relates to a passive containment cooling system.

In at least one example embodiment, a passive containment cooling system comprises a thermal exchange pipe. The thermal exchange pipe includes an outer pipe and an inner pipe. The outer pipe has a first outer pipe end and a second outer pipe end. The first outer pipe end is closed and the second outer pipe end is open. The first outer pipe end is within a primary containment vessel of a boiling water reactor. The second outer pipe end extends into a reactor cavity pool, such that the outer pipe is in fluid communication with the primary containment vessel and the reactor cavity pool. The inner pipe is at least partially within the outer pipe. The inner pipe has a first inner pipe end and a second inner pipe end. The first inner pipe end and the second inner pipe end are open. The second inner pipe end extends out of the outer pipe and into the reactor cavity pool, such that the second inner pipe end is in fluid communication with the reactor cavity pool.

In at least one example embodiment, the outer pipe comprises a pipe wall defining an opening. The inner pipe comprises a curved portion between the first inner pipe end and the second inner pipe end. The curved portion extends through the opening in the pipe wall. The outer pipe has a diameter of 200 mm to 520 mm. The inner pipe has a diameter of 50 mm to 200 mm. The inner pipe and the outer pipe comprise stainless steel.

At least one example embodiment relates to a method of installing a passive containment cooling system. The method of installing a passive containment cooling system comprises placing a thermal exchange pipe at least partially in a primary containment vessel, such that a portion of the thermal exchange pipe extends into a reactor cavity pool.

BRIEF DESCRIPTION OF THE DRAWINGS

The various features and effects of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, like reference numerals in the drawings denote like elements, and thus their description may be omitted.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted may occur out of the order noted in the figures or described in the specification. For example, two figures or steps shown in succession may in fact be executed substantially and concurrently or may sometimes be executed in the reverse order or repetitively, depending upon the functionality/acts involved.

Figure 1:
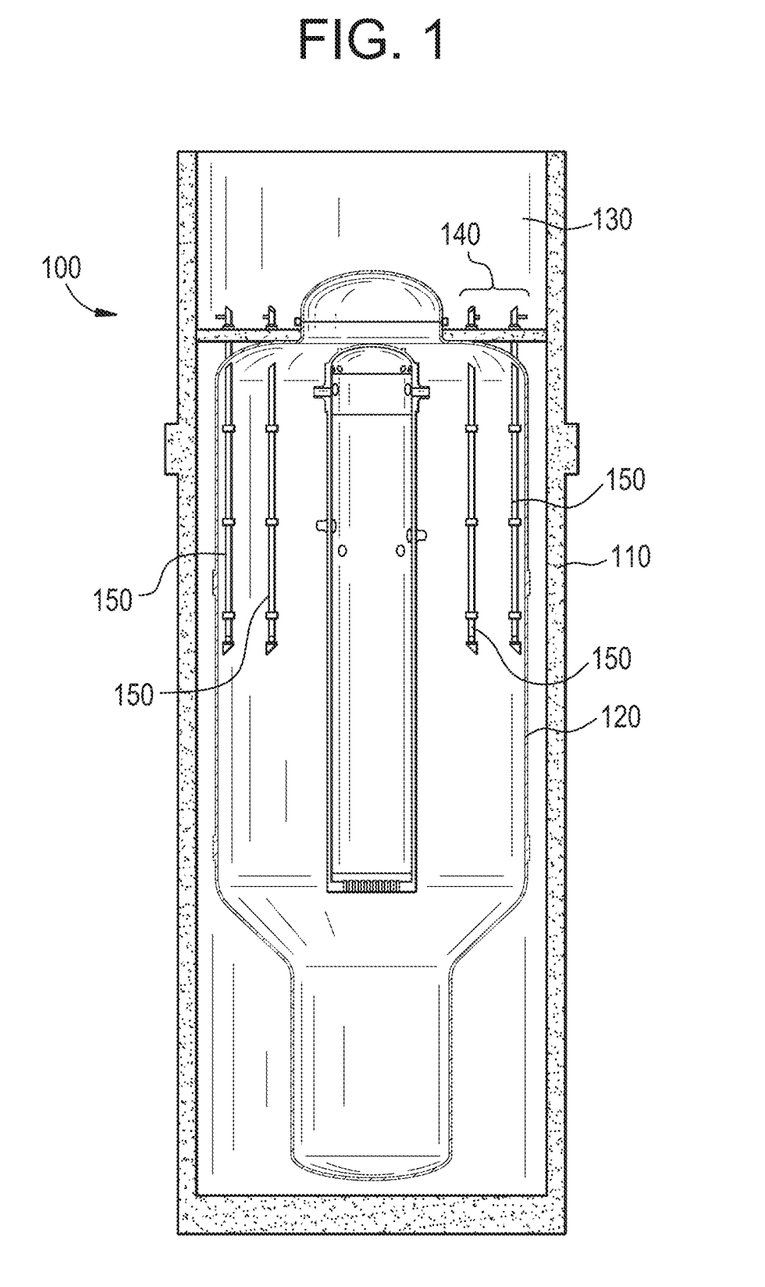
FIG. 1 is a schematic illustration of a boiling water reactor including a passive containment cooling system according to at least one example embodiment.

FIG. 1 is a schematic illustration of a boiling water reactor including a passive containment cooling system according to at least one example embodiment.

In at least one example embodiment, as shown in FIG. 1 a boiling water reactor 100 may be a BWRX-300 reactor and may have components and characteristics of the BWRX-300 reactor. It is understood that components described therein are usable with other plant configurations.

Referring to FIG. 1, the reactor 100 may include a reactor building 110, a primary containment vessel 120, a reactor cavity pool 130, and a passive containment cooling system (PCCS) 140. In at least one example embodiment, the primary containment vessel 120 is housed in a chamber of the reactor building 110. The reactor cavity pool 130 is a water-filled tank used to cool the hot water from the passive containment cooling system in the event of an accident and/or during use. The reactor cavity pool 130 may sit above the reactor building 110 and the primary containment vessel 120 that is at least partially within the reactor building 110.

In at least one example embodiment, the boiling water reactor 100 further includes a core including fuel, channels, control rods, and instrumentation, core support structures including a shroud, shroud support, top guide, core plate, control rod guide tube, and orificed fuel support, chimney, steam dryer assembly, feed water spargers, and in-core guide tubes (not shown).

In at least one example embodiment, the PCCS 140 includes at least one thermal exchange pipe 150. The thermal exchange pipe 150 extends from a chamber in the primary containment vessel, through a wall of the primary containment vessel, through a wall of the reactor building 110, and into the reactor cavity pool 130.

In at least one example embodiment, the PCCS 140 is configured to allow water from the reactor cavity pool 130 to enter the primary containment vessel 120 via the thermal exchange pipe 150. As the thermal exchange pipe 150 absorbs heat, the water is heated to form hot water, which is released via a pathway in the thermal exchange pipe 150 due to differential density. The hot water exits the thermal exchange pipe 150 and enters the reactor cavity pool 130, where the hot water mixes with the reactor cavity pool water and cools by evaporation. The PCCS 140 does not include any valves and pumps, and relies on gravity to feed the water from the reactor cavity pool 130 to the primary containment vessel 120. The cooling process of the PCCS 140 is a continuous process and the water naturally circulates without any forced action.

Figure 2:
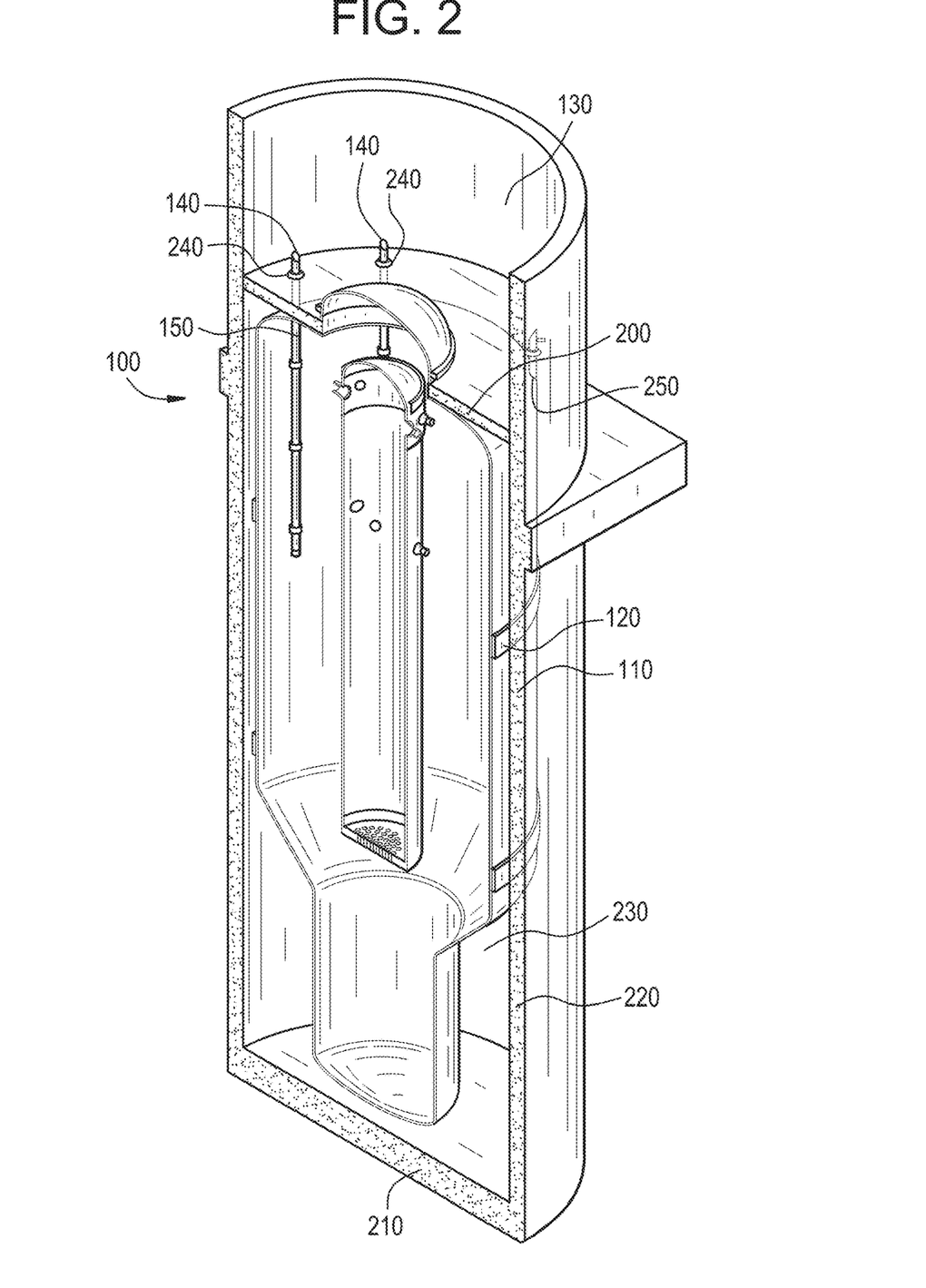
FIG. 2 is a perspective, cross-sectional view of the boiling water reactor of FIG. 1 according to at least one example embodiment.

FIG. 2 is a perspective, cross-sectional view of the boiling water reactor of FIG. 1 according to at least one example embodiment.

In at least one example embodiment, as shown in FIG. 2, the boiling water reactor 100 is the same as in FIG. 1, but is shown in greater detail. As shown in FIG. 2, the reactor building 110 includes a top wall 200, a bottom wall 210, and at least one side wall 220. The reactor building 110 is formed of concrete. The top wall 200, the bottom wall 210, and the at least one side wall 220 define a chamber 230 that houses the primary containment vessel 120. The top wall 220 of the reactor building 110 may define a penetration 240 therein. The thermal exchange pipe 150 extends through the penetration 240. As shown, the boiling water reactor 100 includes multiple thermal exchange pipes 150 and multiple penetrations 240. Each thermal exchange pipe 150 extends through a corresponding one or the multiple penetrations 240 and into the reactor cavity pool 130.

In at least one example embodiment, the primary containment vessel 130 defines at least one passage 250 in a wall thereof. Each of the thermal exchange pipes 150 extends through a respective one of the at least one passages 250 and into the primary containment vessel 120.

Figure 3:
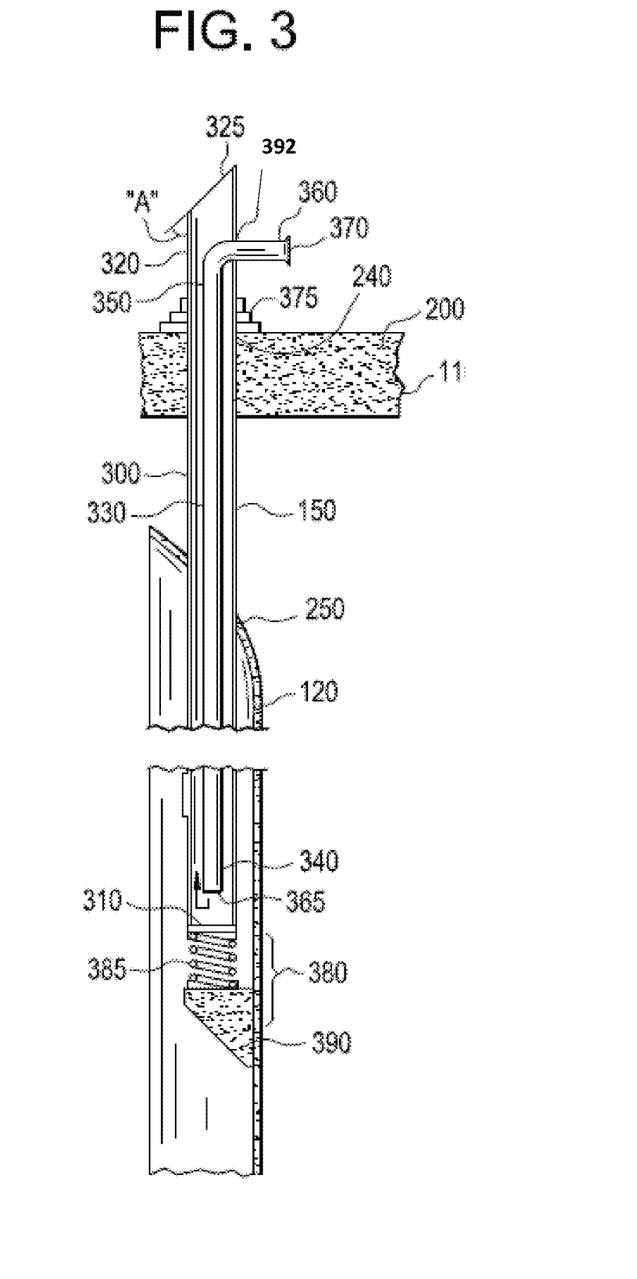
FIG. 3 is a side cross-sectional view of a thermal exchange pipe of the passive containment cooling system of FIGS. 1 and 2 according to at least one example embodiment.

FIG. 3 is a side cross-sectional view of a thermal exchange pipe of the passive containment cooling system of FIGS. 1 and 2 according to at least one example embodiment.

In at least one example embodiment, as shown in FIG. 3, each of the thermal exchange pipes 150 of the PCCS 140 includes an outer pipe 300 having a first outer pipe end 310 and a second outer pipe end 320. The first outer pipe end 310 is a closed end that is positioned within the primary containment vessel 120. The second outer pipe end 320 is an open end having an outlet 325 that is positioned in the reactor cavity pool 130. The outlet 325 is configured to release hot water into the reactor cavity pool 130.

In at least one example embodiment, the second outer pipe end 320 may be angled. In some example embodiments, the second outer pipe end 320 has an angle "A" of about 10° to about 80° (e.g., about 20° to about 70°, about 30° to about 60°, or about 40° to about 50°). For example, the angle "A" may be 45°. The outer pipe 300 may have a diameter of about 200 mm to about 520 mm (e.g., about 250 mm to about 350 mm). The outer pipe 300 may have a length of about 5,000 mm to about 25,000 mm (e.g., about 10,000 mm to about 20,000 mm).

In at least one example embodiment, the thermal exchange pipe 150 includes an inner pipe 330 having a first inner pipe end 340 and an second inner pipe end 360. The first inner pipe end 340 includes an outlet 365 and the second inner pipe end 360 includes an inlet 370, such that there is fluid communication between the inner pipe 330, the reactor cavity pool 130, and an internal portion of the outer pipe 300. Water from the reactor cavity pool 130 enters the inner pipe 330 via the inlet 370 and exits into the outer pipe 300 via the outlet 365. In at least one example embodiment, the inner pipe 330 is at least partially contained within the outer pipe 300.

In at least one example embodiment, the inner pipe 330 has a diameter of about 50 mm to about 200 mm (e.g., about 100 mm to about 175 mm or about 120 mm to about 160 mm). The inner pipe 330 may have a length that is slightly less than the length of the outer pipe 300, such that the first inner pipe outlet 365 is about 100 mm to about 300 mm (e.g., about 150 mm to about 250 mm or about 175 mm to about 225 mm) from the closed first outer pipe end 310 of the outer pipe 300.

In at least one example embodiment, the inner pipe 330 may have a curved portion 350, such that a portion of the inner pipe 330 extends through a hole 392 defined in a wall of the outer pipe 300. The curved portion 350 may be angled at about a 90° angle in relation to the remainder of the inner pipe 330. In other example embodiments, the curved portion 350 may be angled at about 10° to about 80° with respect to the remainder of the inner pipe 330. In other example embodiments, the portion 350 may be an angled portion or a straight portion.

In at least one example embodiment, as shown in FIG. 3, the thermal exchange pipe 150 extends through the passage 250 in the primary containment vessel 120 and through the penetration 240 in the top wall 200 of the reactor building 110.

In at least one example embodiment, the PCCS 140 can include a seal 375 surrounding each thermal exchange pipe 150 at a point where the thermal exchange pipe 150 exits the penetration 240 in the top wall 200. The seal 375 may be any suitable heat tolerant seal. As shown in FIG. 3, the curved portion 350 starts at a point above the seal 375 and the top wall 200 of the reactor building 110.

In at least one example embodiment, each of the thermal exchange pipes 150 is supported by a support 380. The support 380 may include a spring 385 (or flexible support) and a base 390. The spring 385 or flexible support has a first end that acts against the closed end of the outer pipe and a second end that acts against the base 390. Use of a spring 385 or flexible support in the support 380 allows for the thermal exchange pipe 150 to still be supported as the thermal exchange pipe 150 expands due to heat absorption.

In at least one example embodiment, the spring 385 may be about 300 mm to about 500 mm in length. For example, the spring may be about 400 mm in length. The spring 385 may be formed of any suitable material, such as stainless steel.

Figure 4:
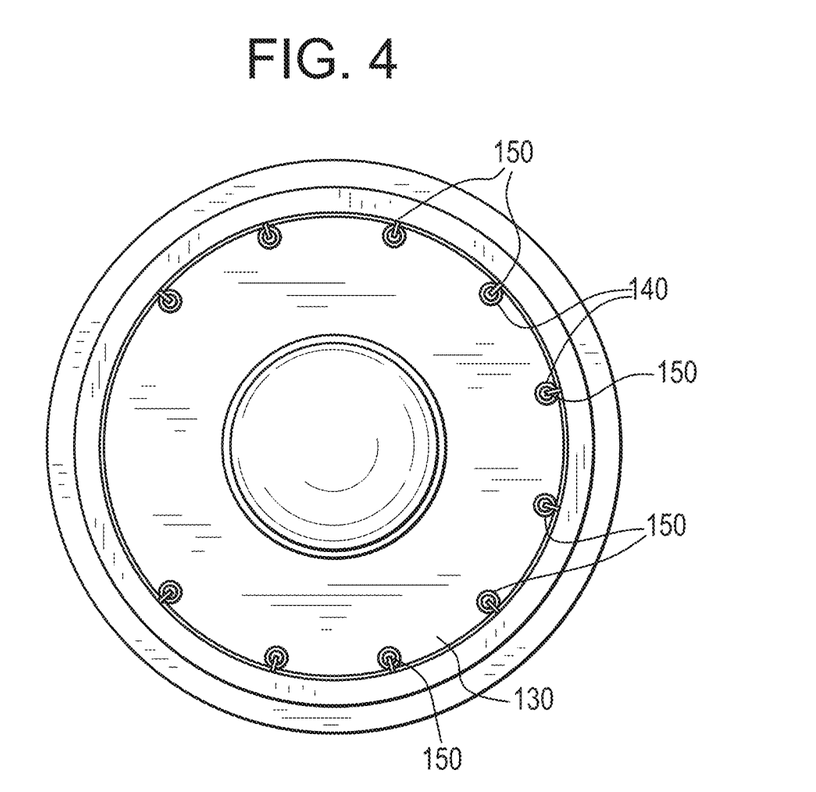
FIG. 4 is top view of a portion of the boiling water reactor of FIG. 1 according to at least one example embodiment.

FIG. 4 is top view of a portion of the boiling water reactor of FIG. 1 according to at least one example embodiment.

In at least one example embodiment, as shown in FIG. 4, the PCCS 140 includes a plurality of thermal exchange pipes 150 extending into the reactor cavity pool 130, which is filled with water. The PCCS 140 can includes two to twenty thermal exchange pipes 150 (e.g., three to nineteen, four to eighteen, five to seventeen, six to sixteen, seven to fifteen, eight to fourteen, nine to thirteen, or ten to twelve). For example, as shown in FIG. 4, the PCCS 140 includes ten thermal exchange pipes 150. The thermal exchange pipes 150 may be substantially uniformly spaced about a perimeter of the primary containment vessel 120. In other example embodiments, the thermal exchange pipes 150 may be arranged non-uniformly about the primary containment vessel 120 or may be arranged in clusters.

In use, the thermal exchange pipes 150 of the PCCS 140 allow for natural circulation of water from the reactor cavity pool 130 into the primary containment vessel 120 via the inlet 370 of the inner pipe 330 of the thermal exchange pipes 150. As the thermal exchange pipes 150 absorb heat, the water is heated and transformed into hot water, which is then released via the outlet 325 in the outer pipe 320 of the thermal exchange pipes 150.

At least one example embodiment relates to a method of installing a passive containment cooling system. The method of installing a passive containment cooling system comprises placing a thermal exchange pipe at least partially in a primary containment vessel, such that a portion of the thermal exchange pipe extends into a reactor cavity pool. When the passive containment cooling system is retrofitted into an existing boiling water reactor, the method may include drilling penetrations and/or passages through a top wall of the reactor building and through a portion of the primary containment vessel. The method may also include installing supports for each thermal exchange pipe and installing thermal exchange pipes.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A boiling water reactor comprising:
  a reactor building including,
    a top wall defining a penetration therein,
    a bottom wall, and
    at least one side wall, the top wall, the bottom wall, and the at least one side wall defining a chamber in the reactor building;
  a reactor cavity pool adjacent the reactor building;
  a primary containment vessel, at least a portion of the primary containment vessel is in the chamber of the reactor building; and
  a passive containment cooling system configured to receive water and expel hot water, the passive containment cooling system including,
    at least one thermal exchange pipe including,
      an outer pipe having a first outer pipe end and a second outer pipe end, the first outer pipe end being closed and the second outer pipe end being open, the first outer pipe end being within the primary containment vessel, and the second outer pipe end extending through the penetration in the top wall of the reactor building and into the reactor cavity pool such that the outer pipe is in fluid communication with the reactor cavity pool, the outer pipe including,
        a side pipe wall defining an opening therein, and
      an inner pipe at least partially within the outer pipe, the inner pipe having a first inner pipe end and a second inner pipe end, the first inner pipe end and the second inner pipe end being open, and the second inner pipe end extending out of the outer pipe and into the reactor cavity pool such that the second inner pipe end is in fluid communication with the reactor cavity pool, the inner pipe including,
        a curved portion between the first inner pipe end and the second inner pipe end, the curved portion extending through and past the opening in the side pipe wall and into the reactor cavity pool.

2. The boiling water reactor of claim 1, wherein the outer pipe has a diameter of 200 mm to 520 mm.

3. The boiling water reactor of claim 1, wherein the inner pipe has a diameter of 50 mm to 200 mm.

4. The boiling water reactor of claim 1, wherein the inner pipe and the outer pipe comprise stainless steel.

5. The boiling water reactor of claim 1, further comprising:
  at least one seal around the outer pipe and adjacent the penetration in the top wall of the reactor building.

6. The boiling water reactor of claim 1, wherein the passive containment cooling system includes a plurality of thermal exchange pipes.

7. The boiling water reactor of claim 6, wherein the passive containment cooling system includes two to twenty thermal exchange pipes.

8. The boiling water reactor of claim 1, further comprising:
  at least one support within the primary containment vessel, the support configured to support the first outer pipe end of the thermal exchange pipe.

9. The boiling water reactor of claim 8, wherein the support comprises a spring support, the spring support configured to allow vertical movement of the thermal exchange pipe caused by expansion due to absorption of heat.

10. The boiling water reactor of claim 1, wherein the passive containment cooling system is valve-free, pump-free, or both valve-free, and pump-free.

11. A passive containment cooling system comprising:
  a thermal exchange pipe including,
    an outer pipe having a first outer pipe end and a second outer pipe end, the first outer pipe end being closed and the second outer pipe end being open, the first outer pipe end being within a primary containment vessel of a boiling water reactor, the second outer pipe end extending into a reactor cavity pool such that the outer pipe is in fluid communication with the reactor cavity pool, the outer pipe including,
      a side pipe wall defining an opening therein, and
    an inner pipe at least partially within the outer pipe, the inner pipe having a first inner pipe end and a second inner pipe end, the first inner pipe end and the second inner pipe end being open, and the second inner pipe end extending out of the outer pipe and into the reactor cavity pool such that the second inner pipe end is in fluid communication with the reactor cavity pool, the inner pipe including,
a curved portion between the first inner pipe end and the second inner pipe end, the curved portion extending through and past the opening in the side pipe wall and into the reactor cavity pool.

12. The passive containment cooling system of claim 11, wherein the outer pipe has a diameter of 200 mm to 520 mm.

13. The passive containment cooling system of claim 11, wherein the inner pipe has a diameter of 50 mm to 200 mm.

14. The passive containment cooling system of claim 11, wherein the inner pipe and the outer pipe comprise stainless steel.

15. A method of installing the passive containment cooling system of claim 11 comprising:
placing the thermal exchange pipe at least partially in the primary containment vessel, such that a portion of the thermal exchange pipe extends into the reactor cavity pool.

\* \* \* \* \*